United States Patent
Walker (10) Patent No.: US 10,061,709 B2
(45) Date of Patent: Aug. 28, 2018

(54) SYSTEMS AND METHODS FOR ACCESSING MEMORY

(71) Applicant: Micron Technology, Inc., Boise, ID (US)

(72) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 14/936,209

(22) Filed: Nov. 9, 2015

(65) Prior Publication Data

US 2016/0062909 A1 Mar. 3, 2016

Related U.S. Application Data

(62) Division of application No. 13/746,141, filed on Jan. 21, 2013, now Pat. No. 9,183,057.

(51) Int. Cl.
*G06F 12/10* (2016.01)
*G06F 12/1009* (2016.01)
*G06F 12/109* (2016.01)
*G06F 12/1027* (2016.01)
*G06F 9/50* (2006.01)
*G06F 13/16* (2006.01)

(52) U.S. Cl.
CPC ........ *G06F 12/1009* (2013.01); *G06F 9/5016* (2013.01); *G06F 12/109* (2013.01); *G06F 12/1027* (2013.01); *G06F 13/1684* (2013.01); *G06F 2212/65* (2013.01); *G06F 2212/657* (2013.01); *Y02D 10/14* (2018.01); *Y02D 10/22* (2018.01)

(58) Field of Classification Search
CPC . G06F 12/1009; G06F 13/1684; G06F 12/109
USPC ......................................................... 711/206
See application file for complete search history.

(56) References Cited

U.S. PATENT DOCUMENTS

| | | | | |
|---|---|---|---|---|
| 5,765,032 A | * | 6/1998 | Valizadeh | H04Q 11/0478 370/235 |
| 5,784,707 A | | 7/1998 | Khalidi et al. | |
| 6,226,724 B1 | | 5/2001 | Biggs | |

(Continued)

FOREIGN PATENT DOCUMENTS

| CN | 104995611 A | 10/2015 |
|---|---|---|
| CN | 104995611 B | 4/2017 |

(Continued)

OTHER PUBLICATIONS

"International Application Serial No. PCT/US2014/012205, International Search Report dated May 14, 2014", 3 pgs.

(Continued)

*Primary Examiner* — Jae Yu (74) *Attorney, Agent, or Firm* — Schwegman Lundberg & Woessner, P.A.

(57) ABSTRACT

Methods of mapping memory cells to applications, methods of accessing memory cells, systems, and memory controllers are described. In some embodiments, a memory system including multiple physical channels is mapped into regions, such that any region spans each physical channel of the memory system. Applications are allocated memory in the regions, and performance and power requirements of the applications are associated with the regions. Additional methods and systems are also described.

12 Claims, 7 Drawing Sheets

(56) References Cited

U.S. PATENT DOCUMENTS

| | | |
|---|---|---|
| 6,477,612 B1 | 11/2002 | Wang |
| 6,523,104 B2 | 2/2003 | Kissell |
| 7,882,307 B1 | 2/2011 | Wentzlaff et al. |
| 8,271,745 B2 | 9/2012 | Ware |
| 9,183,057 B2 | 11/2015 | Walker |
| 2007/0139428 A1* | 6/2007 | Berkeman ........... H03M 13/271 345/565 |
| 2009/0150576 A1 | 6/2009 | Madruga et al. |
| 2010/0332882 A1* | 12/2010 | Nayak ................... G06F 3/0625 713/324 |
| 2011/0138113 A1 | 6/2011 | Leach et al. |
| 2011/0153908 A1 | 6/2011 | Schaefer et al. |
| 2012/0233413 A1 | 9/2012 | Walker |
| 2014/0208060 A1 | 7/2014 | Walker |

FOREIGN PATENT DOCUMENTS

| | | |
|---|---|---|
| TW | 201443646 A | 11/2014 |
| WO | WO-2012033662 A2 | 3/2012 |
| WO | WO-2012161659 A1 | 11/2012 |
| WO | WO-2014113758 A1 | 7/2014 |
| WO | WO-2012033662 A4 | 7/2015 |

OTHER PUBLICATIONS

"International Application Serial No. PCT/US2014/012205, Written Opinion dated May 14, 2014", 9 pgs.

"Application Serial No. PCT/US2014/012205, International Preliminary Report on Patentability dated Jul. 30, 2015", 11 pgs.

"Chinese Application Serial No. 201480008496.5, Office Action dated Mar. 24, 2016", W/ English Translation, 10 pgs.

"Chinese Application Serial No. 201480008496.5, Office Action dated Sep. 13, 2016", w/English Translation, 4 pgs.

"Chinese Application Serial No. 201480008496.5, Response filed Jul. 18, 2016 to Office Action dated Mar. 24, 2016", w/English Claims, 11 pgs.

"Chinese Application Serial No. 201480008496.5, Response filed Nov. 25, 2016 to Office Action dated Sep. 13, 2016", English Translation of Claims, 9 pgs.

"European Application Serial No. 14741065.8, Extended European Search Report dated Jan. 12, 2017", 7 pgs.

* cited by examiner

SYSTEMS AND METHODS FOR ACCESSING MEMORY

PRIORITY APPLICATION

This application is a divisional of U.S. application Ser. No. 13/746,141, filed Jan. 21, 2013, which is incorporated herein by reference in its entirety.

BACKGROUND

Memory systems are used in many electronic devices such as personal digital assistants (PDAs), laptop computers, mobile phones and digital cameras. Some of these memory systems include multiple physical channels having physical pins for communicating with memory cells of the memory system. With some memory mapping schemes, memory maps are generated to map logical addresses of applications using the memory system to the physical channels of the memory system. Portions of one or more of the multiple physical channels may be mapped based on the performance requirements or power requirements of the application that will be running in that memory space. As applications are started or terminated, gaps may be generated in the memory map and it may become increasingly difficult to find available regions in the memory system to suit the needs of any newly started applications.

Some other memory mapping schemes have been proposed to map one or more physical channels to a processor or group of processors, where each channel provides the same performance point or power specifications. While gaps may be avoided, such a homogeneous scheme may not meet the needs of processors with varying performance or power requirements.

BRIEF DESCRIPTION OF THE DRAWINGS

Some embodiments of the disclosed technology are illustrated by way of example and not limitation in the figures of the accompanying drawings in which:

FIG. 2 is a diagram of a memory system according to various embodiments;

DETAILED DESCRIPTION

Figure 1:
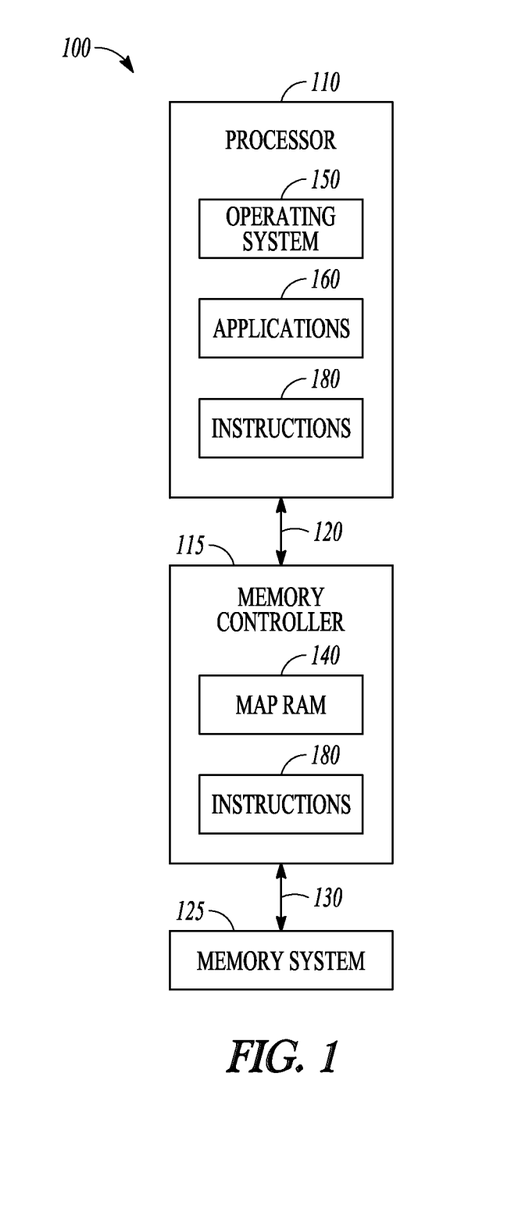
FIG. 1 is a diagram of a system according to various embodiments.

FIG. 1 is a diagram illustrating a system 100 for mapping and accessing memory cells in a multi-channel memory system according to various embodiments. The system 100 may include a processor 110 coupled to a memory controller 115 through a first bus 120. The memory controller 115 may be coupled to a memory system 125 through a second bus 130. The memory controller 115 may execute memory transaction requests from the processor 110. The memory controller 115 transfers data between the processor 110 and the memory system 125 over the first and second buses 120 and 130. The first bus 120 and the second bus 130 may employ a known protocol to connect the processor 110 to the memory controller 115 and to connect the memory controller 115 to the memory system 125. Some examples of system 100 may include personal computers, laptop computers, personal digital assistants (PDAs), digital cameras, electronic games, digital media player/records, and the like.

The memory system 125 may comprise one or more physical devices (not shown) each comprised of one or more physical channels (not shown) that are mapped to regions according to a data structure, hereinafter referred to by example as a "table", stored in a map RAM 140 in the memory controller 115. The memory system 125 and the relationship between physical devices and physical channels are described in more detail below with respect to FIG. 2. The table may further be redundantly stored on a second map RAM (not shown) of the memory controller 115. The one or more map RAMs 140 may be, for example, static random-access memory (SRAM).

The processor 110 may also be referred to as a master, and there may be more than one master in system 100. An operating system (OS) 150 and one or more applications 160 may execute on the processor 110. The OS 150 may request memory in the memory system 125 on behalf of the one or more applications 160. The OS 150 may program a start address and an end address that define a region of the memory system to be mapped to the application 160 in the map RAM 140. The OS 150 may further program channel depth values for the regions of the memory system in the map RAM 140.

In other embodiments, the memory controller 115 may be co-located with the processor 110. In embodiments, the processor 110 may be a system-on-chip (SOC) and the processor 110 may use the memory controller 115 to perform memory operations on the memory system 125.

The system 100 may include a machine-readable medium on which is stored one or more sets of instructions 180 (e.g., software) embodying any one or more of the methodologies or functions described herein. The instructions 180 may reside, completely or at least partially, within the processor 110 or the memory controller 115 during execution thereof by the system 100, with the processor 110 and the memory controller 115 also constituting machine-readable media.

The machine-readable medium may be a single medium or may be multiple media (e.g., a centralized or distributed database, and/or associated caches and servers) that store the one or more sets of instructions. "Machine-readable medium" may include any non-transitory medium that is capable of storing, encoding, or carrying a set of instructions of execution by the machine. By way of example and not limitation, "machine-readable medium" may include solid-state memories, optical media, or magnetic media.

FIG. 2 is a block diagram of a memory system 125 according to various embodiments. In the illustrative example, the memory system 125 comprises physical channels 210-1 through 210-8 arranged in parallel. A physical channel can comprise a set of physical pins (not shown) used to communicate with the corresponding memory cells in memory banks B0-Bb of the memory system 125. A physical device may include one or more physical channels. Examples of physical devices may include dynamic random access memory (DRAM) devices, synchronous dynamic random access memory (SDRAM) devices and Flash memory devices. Hereinafter, the term "physical channel" may be interpreted to mean either a physical channel of a single-channel physical device, a physical channel of a multi-channel physical device, or a physical channel of multiple physical devices. The memory system 125 may comprise any natural number N of physical devices and therefore any number M of physical channels, where M is a natural number multiple of N. As shown, an OS page may span across each of the physical channels 210-1 through 210-8. The OS page is described in more detail below with respect to FIG. 3. Each of the physical channels 210-1 through 210-8 may be placed in a plan other than the parallel arrangement shown in FIG. 2.

The memory controller 115 may convert addresses received from a processor 110 into device address signals according to address mapping schemes. These device address signals may include bank, row and column address signals for accessing desired portions of physical memory in the memory system 125.

Some memory controllers, for example, may implement an address mapping scheme to map addresses across a subset of physical channels of a system, so that a region mapped to one particular application may span across, for example, two of eight physical channels, while a region mapped to a different application may span across four more of the eight physical channels. Further, the different applications may have varying memory requirements and therefore the mapped regions will comprise varying numbers of rows of memory cells. While mapping the regions in this way will allow different applications to operate at different performance points or under different power usage profiles by allowing the physical channels to be configured at different channel depths for different applications, unfillable gaps may be generated in the memory map as applications are started and stopped. For example, a gap of a certain width and comprising a certain number of memory pages may be unusable unless an application is later initiated that requires that particular interface width or amount of memory.

Figure 3:
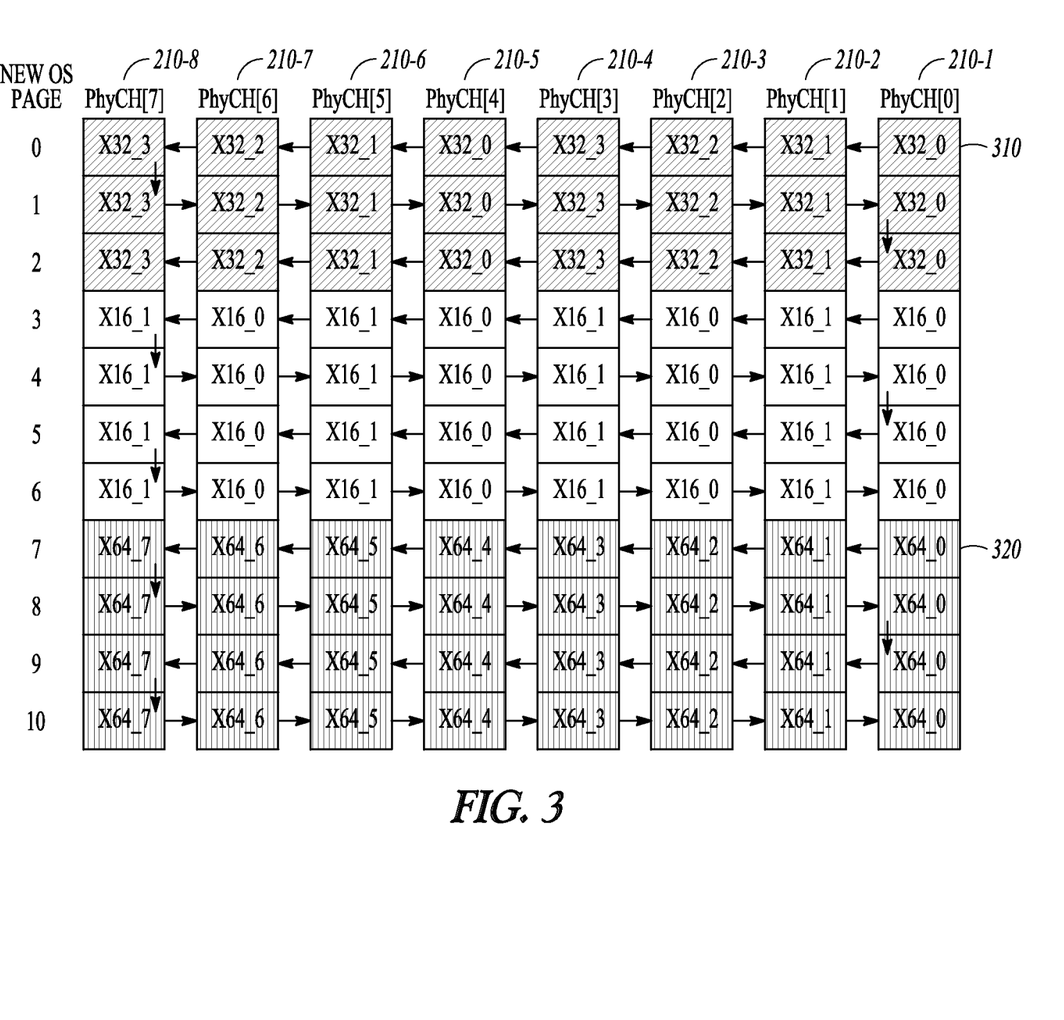
FIG. 3 is a diagram of address mappings according to various embodiments.

Embodiments provide non-homogeneous memory mapping methods adapted to permit different memory performance points for different applications without leaving inefficient gaps in the memory map. FIG. 3 is diagram of an example map that may be created when mapping methods are implemented in accordance with some embodiments. As an illustrative example, the OS 150 may map a region 310 of the memory system to a requesting process, such as an application 160 requiring memory in the amount of three OS pages. Each OS page spans across the physical channels 210-1 through 210-8 to include at least a respective portion of each of the physical channels 210-1 through 210-8. In embodiments, an OS page includes the same row in each of the physical channels 210-1 through 210-8. Each OS page includes an amount of memory equal to the number of physical channels 210-1 through 210-8 multiplied by the number of banks in each physical channel 210-1 through 210-8, and further multiplied by the number of bytes in, for example, a DRAM page (typically on the order of 256 kilobytes or 512 kilobytes).

According to embodiments, the OS 150 may allocate a natural number multiple of OS pages to subsequent applications 160. A region can correspond to rows of memory cells and rows in the memory map. Therefore, assuming that the requested amount of memory is available in the memory system 125, regardless of the I/O width or channel depth needs of an application 160, an appropriate number of OS pages may be allocated by the OS 150 based on the memory requirements of requesting applications without generating unfillable gaps over time. The appropriate number of OS pages is thereby mapped to the corresponding application 160. Using the region definitions, such as the data values stored in association with physical starting and ending addresses of these regions and channel depths of these regions, as described in more detail below, the memory controller 115 may control memory transactions according to performance and/or power requirements of the individual applications 160.

Figure 4:
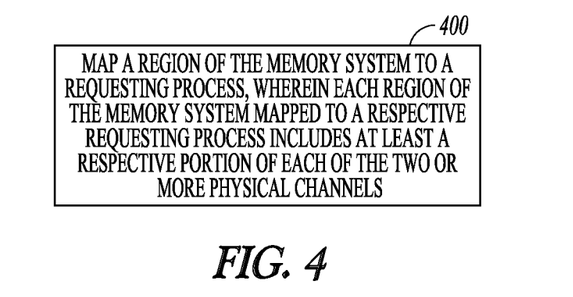
FIG. 4 is a flow diagram illustrating a method for mapping addresses according to various embodiments.

FIG. 4 is a flow diagram illustrating a method of mapping a memory system having two or more physical channels according to various embodiments. In embodiments, concurrently or in association with application 160 startup or initialization, an application 160 may request a certain amount of memory, hereinafter a memory allocation, from the OS 150. The OS 150 examines the table stored in the map RAM 140 to determine starting and ending addresses of an available portion of the memory that has the desired size. The OS 150 stores a starting address and an ending address for the application 160, in the table, defining a region of the memory system. The region will comprise the requested size of memory, in natural number multiples of OS pages, such that each OS page includes at least a respective portion of each physical channel 210-1 through 210-8. The OS 150 programs the starting address and ending address for the region into a table in the map RAM 140 thereby mapping, in operation 410, the region to a logical memory of a requesting process, e.g., the application 160. The region is mapped by the OS 150 to include the same rows of memory cells in each of the physical channels 210-1 through 210-8. The region will not necessarily comprise contiguous OS pages within the memory system. Non-contiguous OS pages are described in more detail below with respect to FIG. 3.

The OS 150 may store a value associated with the region in the table in the map RAM 140. The value may indicate a number of bytes to be accessed from each of the two or more physical channels before an address mapped to the region increments into a different channel. This value may be known as a "channel depth," described in more detail below.

In some embodiments, the application 160 may further notify the OS 150 of a desired channel depth, where the channel depth is the number of bytes that will be accessed from the physical channel before the address moves (e.g., rolls, increments, or crosses) into another physical channel. The channel depth may reflect the desired performance point and/or the desired power profile of the requesting application 160. The channel depth can be selected based on a desired balance between power and performance requirements according to various embodiments, as described in more detail below.

In some embodiments, the OS 150 may access a memory unit in which is stored the desired channel depth of the application 160. In some embodiments, the application 160 may notify the OS 150 of its desired channel depth. In further embodiments, the OS 150 may learn, for example through gathering of measurement data related to application 160 performance, optimal channel depths for the application 160. The OS 150 may then store the desired channel depth such that it is associated with the region mapped to that application 160. As will be described below, the memory controller 115 will use the channel depth for the region to determine how to handle accesses to memory in the region. Because regions are mapped as multiples of OS pages, the minimum region size equals the size of one OS page. Additionally, the OS page is the minimum granularity with which the memory controller 115 will be able to control channel depth in the operations described below.

In an embodiment, the memory controller 115 may redundantly maintain two map RAMs (not shown). The OS 150 may examine and program one of the map RAMs 140 while the memory controller 115 may use the other map RAM (not shown) for controlling transactions on memory cells of the memory system 125. At such a time as the OS 150 has programmed starting and ending addresses and an associated channel depth for a new region, the OS 150 may notify the memory controller 115 that an updated map RAM 140 is available, and the memory controller 115 may then switch to using the updated map RAM 140.

Referring to FIG. 3, while the figure illustrates regions of contiguous OS pages, OS pages within a region need not be contiguous. For example, an OS page in region 310 could be located at any lower available row, for example row 11, while other OS pages in region 310 are located at rows 0 and 1. Methods according to embodiments described herein operate according to similar principles regardless of whether the OS pages within a region are contiguous.

Regions thus having been mapped to applications 160 and application performance points, the memory controller 115 controls access to memory within the regions based on the region definitions in the table in the at least one map RAM 140, such as according to the channel depths associated with each region. An application 160 may access the memory system 125, via the processor 110 and under control of the memory controller 115, according to the method illustrated in FIG. 5.

Figure 5:
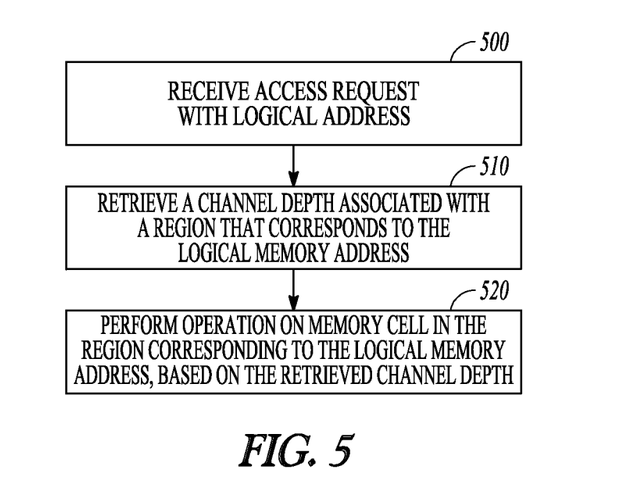
FIG. 5 is a flow diagram illustrating a method for performing transactions on memory cells according to various embodiments.

In operation 500, the memory controller 115 receives a request for access to the memory system 125. The request for access includes a logical memory address of the requesting application 160. The request for access may be a request to perform a transaction, such as a read operation or a write operation, upon a memory cell(s) of the memory system 125. The logical memory address may be configured according to a particular addressing method, depending on the manner in which the regions are configured. Example addressing methods are described below with respect to FIGS. 6 and 7.

Figure 6:
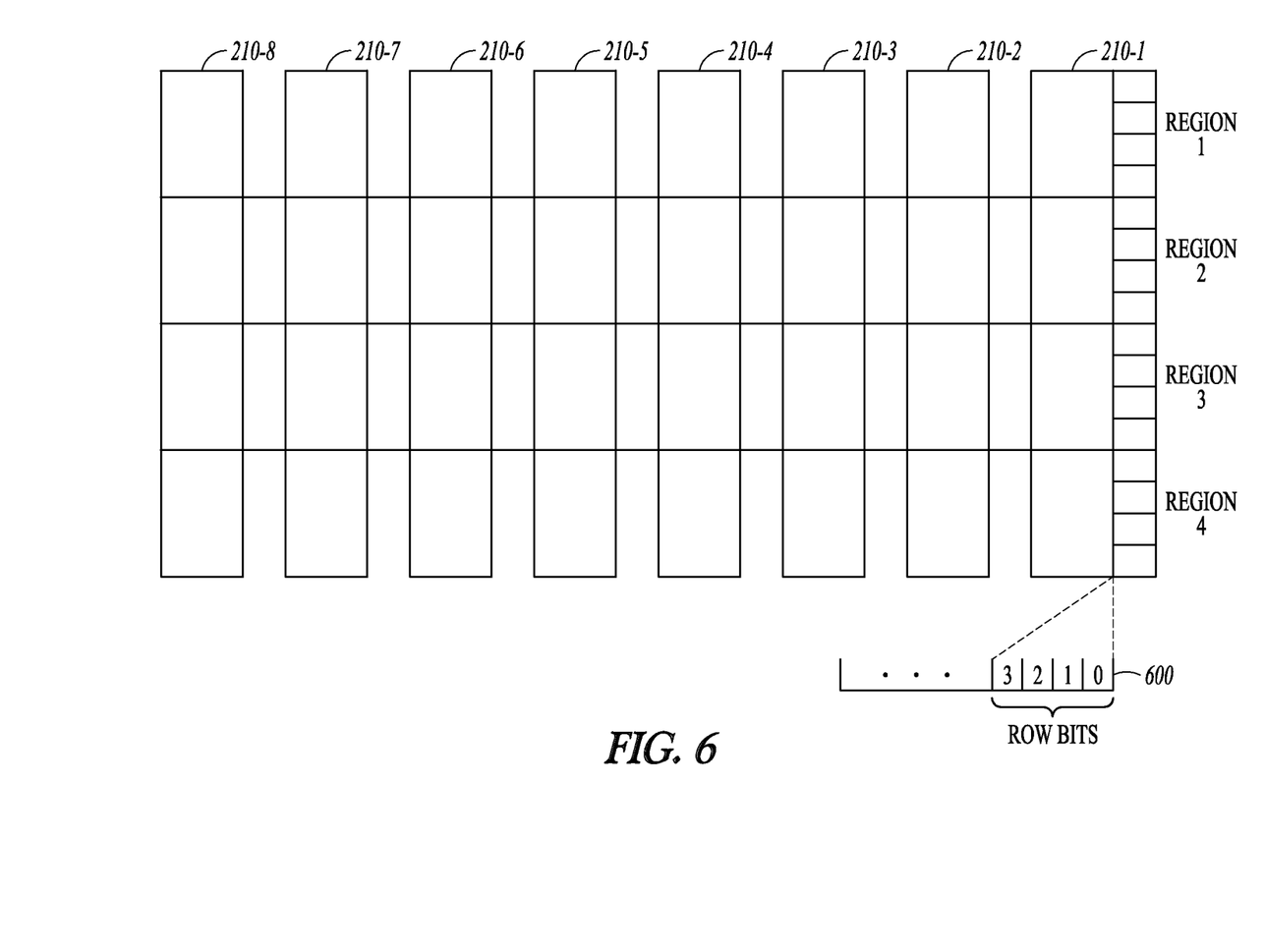
FIG. 6 is a diagram of an address configured according to an addressing method according to various embodiments.

A first example addressing method is described with respect to FIG. 6. In one example embodiment, region sizes may be fixed in the memory system 125 hardware, at the time the memory system 125 is manufactured. The regions may be fixed to be the same size, or the regions may be fixed to be different sizes. In the illustrative example, the regions each comprise four OS pages (e.g., four rows of memory cells) in each of the physical channels 210-1 through 210-8. Therefore, the row numbers at each region are known and the region being addressed can be inferred based on the row numbers, typically the upper bits in the logical memory address 500. The memory controller 115 then looks up the channel depth that was defined for that region when the OS 150 mapped the region to the application 160. In an example, the memory controller 115 examines a table stored in map RAM 140 (see FIG. 1) to look up the corresponding channel depth.

Figure 7:
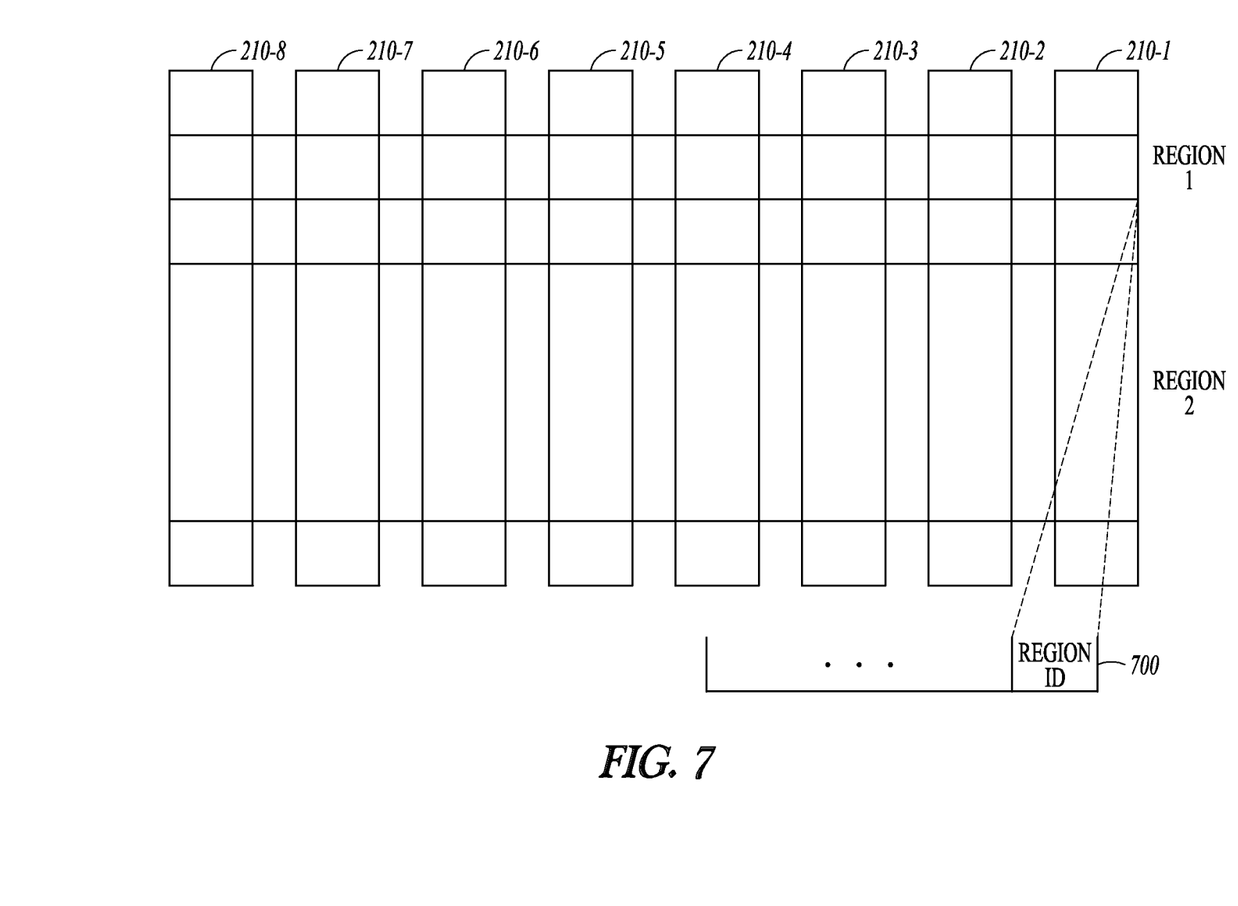
FIG. 7 is a diagram of an address configured according to another addressing method according to various embodiments.

In a second example addressing method shown in FIG. 7, the regions may not be fixed and may or may not be equally sized or symmetric. Instead, the region size may be determined when, for example, the OS 150 requests allocation of memory on behalf of, for example, application 160. The OS 150 may include region identification bits that identify the region to which the application 160 is mapped. The memory controller 115 looks up the channel depth, defined for that region when the region was mapped to the application 160, based on the region identification bits in the logical address. In an illustrative example, the memory controller 115 examines a table stored in a map RAM 140 (see FIG. 1), where the table associates a region (e.g., as identified by region identification bits) to a desired channel depth for that application 160.

Referring again to FIG. 5, in operation 510, the memory controller 115 retrieves, from the map RAM 140, a channel depth associated with a region that corresponds to the received logical address. As previously described, the region is distributed across the two or more physical channels 210-1 through 210-8 to include respective portions of the two or more physical channels 210-1 through 210-8, and the portions are located at a same position within each of the one or more physical channels 210-1 through 210-8. The memory controller 115 then performs an operation on the memory system in operation 520, starting at a memory cell in the region corresponding to the logical memory address, based on the defined channel depth for that region. Operation 520 is described in further detail in the following paragraphs, with reference to FIG. 3.

Referring again to FIG. 3, each region in a multi-channel memory system can have a different channel depth. As previously described, each region's channel depth is stored in map RAM 140 such that each channel depth is associated with the channel depth's corresponding region. Channel depth can be defined as the number of bytes that will be accessed from the channel before the address moves (e.g., rolls, increments, or crosses) into another channel. In embodiments, the region's associated channel depth will determine how the region's interface will appear to the application 160 mapped to the region. For example, if the region's channel depth is 8 bytes, then operation 520 accesses all eight physical channels in parallel such that the memory system appears to have an x64 interface as in region 320 of FIG. 3. In this illustrative example, the requesting application 160 may be an application requiring low latency and high performance because of the large number of channels operating in parallel. Shallower channel depths may therefore be requested for applications requiring low latency.

On the other hand, applications that are latency-insensitive may request deeper channel depths, which results in narrower interfaces. If the channel depth is to be 16 bytes, then operation 520 will access four physical channels in parallel such that the memory system appears to have an x32 interface. As an illustrative example, region 310 of FIG. 3 is mapped to an application with a 16-byte channel depth. As shown by the arrows, starting at the right end of OS Page 0, memory access starts at the right, and trends toward the left. If the region rows were not mapped contiguously, the OS 150 will have kept track of the starting address for the next row, and access will proceed at that next row at the appropriate point. At the end of Row 0, access moves immediately down to Row 0 and proceeds from left to right. The four physical channels that will be accessed will depend on the logical address for the transaction that the memory controller 115 received during the access request of operation 400.

Similarly, if the channel depth is to be 32 bytes then two physical channels will be accessed in parallel such that the memory system appears to have an x16 interface. The two physical channels that will be accessed will depend on the address of the transaction, with access proceeding according to the directional arrows of FIG. 3. Finally, if the channel depth is to be 64 bytes, then one physical channel at a time will be accessed so that the memory system 125 appears to have an x8 interface. The physical channel to be accessed will depend on the address of the transaction.

Application latencies may be reduced as channel depths become shallower and more physical channels are accessed in parallel. On the other hand, power requirements may be increased with shallower channel depths. Therefore, deeper channel depths may be preferred to reduce power consumption for applications that can accept more latency.

Figure 8:
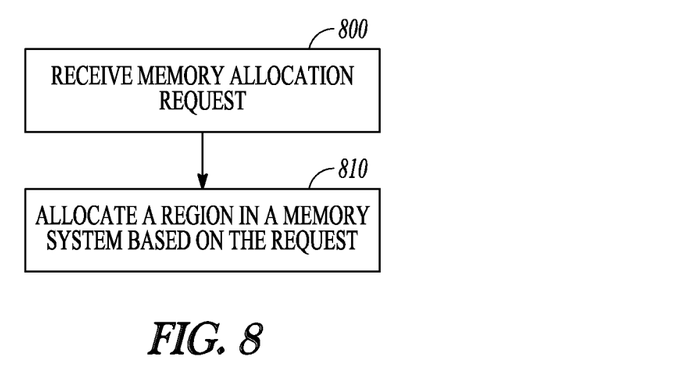
FIG. 8 is a flow diagram illustrating a method for allocating memory according to various embodiments.

FIG. 8 is a flow diagram illustrating a method of allocating memory in a memory system 125 according to various embodiments. In operation 800, an OS 150 receives a memory allocation request from an application 160. In operation 810, the OS 150 allocates a region in a memory system 125 based on the request. As described previously, the memory system 125 includes a plurality of physical channels 210-1 through 210-8 within one or more physical devices. The region is distributed to include a same portion of each of the plurality of physical channels 210-1 through 210-8. The OS 150 writes at least one start physical address and corresponding end physical address to the map RAM 140 of the memory controller 115, corresponding to a number of OS pages comprising a region, where the number of OS pages comprises sufficient memory to fulfill the memory allocation request of the application 160. The memory allocation request may include a desired channel depth value for the application 160. As previously described, the OS 150 may receive, from an application 160, logical memory addresses for transactions to be performed on the memory system 125. The logical memory address may be configured based on an addressing method described above with respect to FIG. 6-7.

The apparatus of various embodiments includes or can be included in electronic circuitry used in high-speed computers, communication and signal processing circuitry, memory modules, portable memory storage devices (e.g., thumb drives), single or multi-processor modules, single or multiple embedded processors, multi-core processors, data switches, and application-specific modules including multi-layer, multi-chip modules. Such apparatus may further be included as sub-components within a variety of electronic systems, such as televisions, memory cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The above description and the drawings illustrate embodiments to enable those skilled in the art to practice the embodiments. Other embodiments may incorporate structural, logical, electrical, process, and other changes. In the drawings, like features or like numerals describe substantially similar features throughout the several views. Portions and features of some embodiments may be included in, or substituted for, those of others. Many other embodiments will be apparent to those of skill in the art upon reading and understanding the above description.

The Abstract of the Disclosure is provided to comply with 37 C.F.R. § 1.72(b), requiring an abstract that allows the reader to quickly ascertain the nature of the technical disclosure. The Abstract is submitted with the understanding that it will not be used to interpret or limit the claims.

What is claimed is:

1. A method for accessing a memory system, the method comprising:
receiving a request for access, the request including a logical memory address;
retrieving a channel depth associated with a region of the memory system that corresponds to the logical memory address, each region of the memory system distributed across multiple physical channels of the memory system to include at least a respective portion of each of the multiple physical channels, the respective portions being located at a same position within each of the multiple physical channels; and
performing an operation on the memory system in the region corresponding to the logical memory address, based on the retrieved channel depth and based on the request for access.

2. The method of claim 1, wherein the logical memory address further comprises at least one bit for indicating the identity of the region to which the logical memory address has been mapped, and the at least one bit is added to the logical memory address by a processor making the access request.

3. The method of claim 1, further comprising:
determining an address within the region on which to perform the requested operation using the received logical address, a starting physical address stored for the region and an ending physical address stored for the region.

4. The method of claim 1, wherein retrieving a channel depth comprises retrieving a channel depth value of the region; and wherein performing an operation on the memory system based on the retrieved channel depth comprises determining, based on the channel depth value, a point at which to move a physical address within one of the physical channels to access the physical address.

5. The method of claim 4, wherein performing an operation on the memory system further comprises accessing, in parallel, a respective memory cell from each of a number of the physical channels, the number being based on the channel depth value of the region.

6. A method comprising:
receiving a memory allocation request;
programming a data structure of a memory controller to include a start address and an end address for a region of a memory system based on the request, the memory system including a plurality of physical channels, each region of the memory system including at least a respective portion of each multiple physical channels of the memory system;
the request includes a channel depth value indicating the number of bytes to be accessed from each of the plurality of physical channels of the memory system before an address mapped to the region moves into a different physical channel, and
the region includes a number of rows of the plurality of physical channels based on the requirements of the application.

7. The method of claim 6, further comprising:
receiving a second memory allocation request;
examining the data structure to determine a second start address for the second memory allocation; and
programming the data structure to include the second start address as the start address for a second region.

8. The method of claim 6, further comprising:
receiving a request to access the region in the memory system, the request including an address for which access is requested;
appending at least one region-identifying bit to the address; and
communicating the address to a memory controller.

9. The method of claim 6, wherein the channel depth value is based on at least one of a performance requirement and a power requirement of a process requesting the memory allocation.

10. A memory controller for a memory system, the memory controller comprising:
a memory configured to store a data structure that defines the plurality of regions of the memory system, each region of the plurality of regions of the memory system comprising at least a respective portion of each of multiple physical channels of the memory system, wherein the memory is further configured to store a respective channel depth value for each of the regions, the channel depth value indicating a number of bytes to be accessed from each of the multiple physical channels of the region before an address mapped to the region moves into a different physical channel of the region.

11. A system comprising:
a memory system having two or more physical channels, each physical channel including a respective plurality of rows of memory cells;
a processor configured to map an application executing on the processor to a respective region of a plurality of regions of the memory system; and
a memory controller configured to store a data structure that defines the plurality of regions of the memory system, wherein each region of the plurality of regions of the memory system includes at least a respective portion of each of the multiple physical channels of the memory system, wherein the memory controller is further configured to store a respective channel depth value for each of the regions, the channel depth value indicating a number of bytes to be accessed from each of the multiple physical channels of the region before an address mapped to the region moves into a different physical channel of the region.

12. A computer-readable medium comprising instructions that, when implemented on a machine, cause the machine to:
write a first address and a second address to a memory, the first address and the second address representing, respectively, a starting address of a region of a memory system to be allocated to a software application and an ending address of the region of the memory system, the memory system including two or more physical channels, and wherein each of the regions includes at least a respective portion of each of multiple physical channels of the memory system, wherein the memory stores a respective channel depth value for each of the regions, the channel depth value indicating a number of bytes to be accessed from each of the multiple physical channels of the region before an address mapped to the region moves into a different physical channel of the region.

* * * * *